United States Patent [19]

Winiger

[11] Patent Number: 4,861,981
[45] Date of Patent: Aug. 29, 1989

[54] OPTOELECTRONIC THEODOLITE SENSOR

[75] Inventor: Hans-Rudolf Winiger, Zollbrück, Switzerland

[73] Assignee: Notron Engineering AG, Zollbrück, Switzerland

[21] Appl. No.: 192,192

[22] Filed: May 10, 1988

[30] Foreign Application Priority Data

Sep. 15, 1986 [CH] Switzerland .................. 3686/86

[51] Int. Cl.⁴ .............................................. G01D 5/34
[52] U.S. Cl. .................................. 250/231 R; 33/366
[58] Field of Search ............... 33/366, 367, 377, 379, 33/281, 282, 285, 1 T, 1 N; 250/231 R, 577, 576, 239

[56] References Cited

U.S. PATENT DOCUMENTS

| | | | |
|---|---|---|---|
| 3,487,303 | 12/1969 | Remington | 33/366 |
| 3,863,067 | 1/1975 | Gooley | 250/231 R |
| 4,154,000 | 5/1979 | Kramer | 33/366 |
| 4,307,516 | 12/1981 | Walker | 33/366 |
| 4,641,434 | 2/1987 | Engler | 33/366 |

FOREIGN PATENT DOCUMENTS 56-107113  8/1981  Japan .
2152659  8/1985  United Kingdom .

Primary Examiner—David C. Nelms
Assistant Examiner—Michael Messinger
Attorney, Agent, or Firm—Welsh & Katz

[57] ABSTRACT

An optoelectronic theodolite sensor contains in a frame, a cylindrical measurement cell half filled with an opaque liquid or entirely filled with two overlying immiscible liquids, each of which fills half of the cell, the first one being opaque and the other transparent to light. In the normal position of the measurement cell, the liquid or the interface between the two liquids forms with opaque side surfaces of the cell faces, an exact quadrant through which the light of a light source reaches an optoelectronic element located on the opposite side of the measurement cell. An angular displacement of the measurement cell causes a change in the intensity of the light reaching the optoelectronic element, which is converted and then applied as a function of the displacement angle $\phi$.

19 Claims, 1 Drawing Sheet

OPTOELECTRONIC THEODOLITE SENSOR

BACKGROUND OF THE INVENTION

This invention concerns an optoelectronic theodolite sensor for the measurement of vertical and/or horizontal angles.

In contrast to the customary practice of using theodolites with electrooptical measuring circles, tubular levels, box levels or sextants for the measurement of angles in navigation and geodesy, for checking the position of vertical and horizontal parts, for measuring the tilt of the earth's surface, the deflection of the vertical and earth tides, or for measuring seismicity, the design of this invention provides an optoelectronic theodolite sensor which can be used for all of these measurement tasks.

The levels, pendulums, gyroscopic markers, mercury horizons or plate glass panes used to measure the visible or artificial horizon in prior art devices can be applied to measurement of the deflection of the horizontal or vertical only by means of graduated circules or graduated arcs. Moreover, these instruments or sensors are either imprecise or very costly to manufacture, and they are usually capable of only a limited field of application.

SUMMARY OF THE INVENTION

This invention is intended to remedy these shortcomings. This invention solves the foregoing problems by providing an optoelectronic theodolite sensor wherein all angles between the horizontal and the vertical can be determined very precisely and without mechanical or optical reading.

One embodiment of the present invention comprehends an optoelectronic theodolite sensor which comprises:

(a) a vertically positioned hollow measuring cell having spaced parallel faces confining an opaque liquid filling half of the height of said measuring cell, the parallel faces each having a transparent verticle side portion and an opaque verticle side portion, with the opaque portions positioned opposite to and congruent with each other and the transparent portions positioned opposite to and congruent with each other;

(b) at least one light source positioned on one side of the measuring cell and spaced therefrom; and, (c) at least one optoelectronic sensing element positioned on the other side of the measuring cell and spaced therefrom, whereby rotation of the measuring cell from the verticle causes the level of the opaque liquid to vary the luminous flux passing through the transparent side portion of the measuring cell from the light source to the optoelectronic sensing element to thereby cause an output signal change measurable as a function of the angle of rotation from the verticle axis and the horizontal axis of the measuring cell.

The advantages provided by the invention essentially reside in the ability to obtain absolute measurements of all angles between the horizontal and the vertical in a very fast and precise manner. In addition, the invention is also attractive by reason of its simple construction and the use of very exact physical magnitudes. Furthermore, the measurement principle upon which it is based requires no manual intervention and is insensitive to external influences.

By adjustment and appropriate construction, this invention can be used in virtually all technical fields in which precise angles to the horizontal or the vertical, or angular deflections from the horizontal or vertical, are of interest. This invention is described in greater detail hereinbelow, with reference to the drawings which illustrate only one embodiment.

DESCRIPTION OF THE PREFERRED EMBODIMENT

Figure 1:
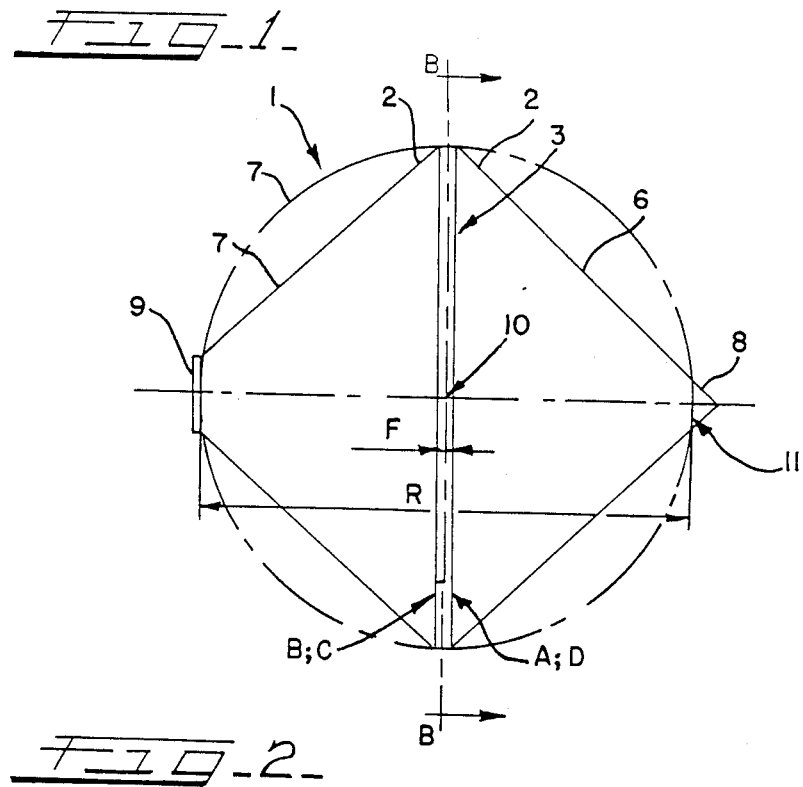
FIG. 1 discloses an optoelectronic theodolite sensor which is shown in a schematic cross section taken along line A—A of FIG. 2.

The figures show an optoelectronic theodolite sensor whose basic structure consists of a housing or support frame 2, a measuring cell 3 having parallel faces, which is filled halfway with an opaque liquid 4 or two immiscible liquids 4 and 5 lying one atop the other, one of these liquids 4 being opaque and the other liquid 5 being transparent, the cap-shaped or spherical covers or housings 6 and 7, a light source 8 and an optoelectronic sensing element 9 positioned directly opposite thereto.

Figure 2:
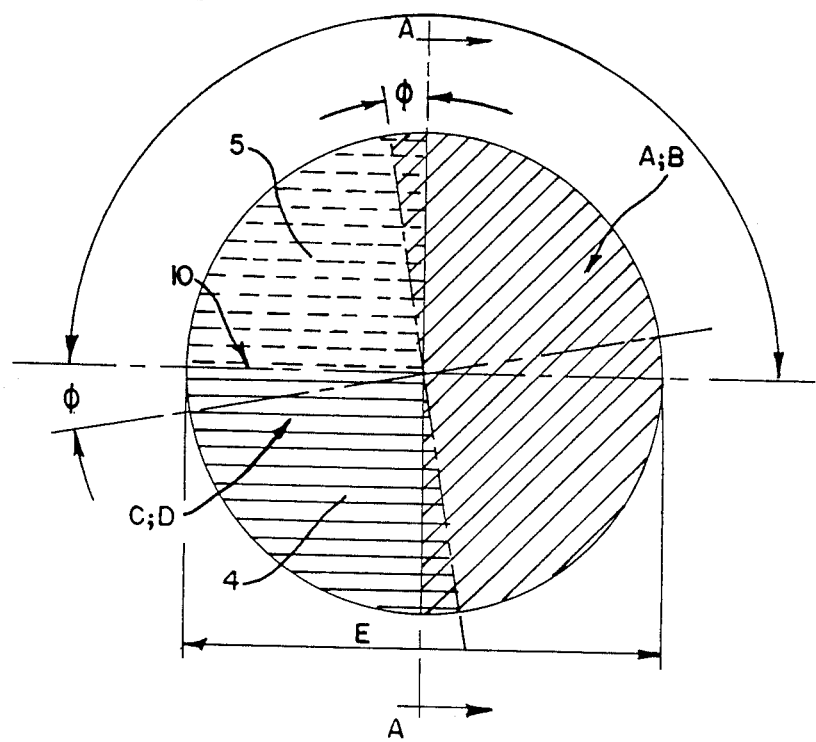
FIG. 2 is a schematic cross section taken along line B—B of FIG. 1.

FIG. 2 shows that the measuring cell 3 has circular faces exposed to the light source 8 and the sensing element 9. With further reference to FIG. 2, the right sides A and B of the parallel faces of the measuring cell are opaque while the left sides C and D of the faces are transparent. In its normal position, the optoelectronic theodolite sensor 1 is situated so that the liquid horizon 10, or the contact surface 10 between two immiscible liquids 4 and 5, is located precisely in the center of the preferably cylindrical measuring cell, an arrangement which can be achieved by filling the measuring cell precisely halfway with a single liquid 4 or by filling it completely with the two liquids 4 and 5 in a 1:1 ratio.

If the normal position is now rotated by a positive or a negative angle $\phi$, the visible or uncovered area of the sector of left side faces C and D, which sector is precisely $\frac{1}{4}$ in the normal position, becomes smaller or larger, since the opaque liquid 4 now covers a larger or smaller sector. This change in the uncovered or transparent area decreases or increases the luminous flux passing through the measuring cell to the optoelectronic element 9, whose signal change is now converted as a function of the angle $\phi$ and is used as a measurement value.

An especially preferred embodiment of the optoelectronic theodolite sensor having the characterizing features set forth hereinabove provides that when two immiscible liquids are used, their densities should differ as widely as possible. This is to assure that the binary liquid system will give a sharp dividing line at the contact surface 10. In addition, the liquids used preferably have as low a vapor pressure and melting point as possible. Many organic and even inorganic compounds are suitable for this purpose, such as, for example, the following binary systems:

higher monovalent and polyvalent alcohols/aromatic compounds or halogenated hydrocarbons:

organic acid anhydrides/aliphatic hydrocarbons;

mercury complexed with water by the addition of a surfactant or alcohol or carbon disulfide/aliphatic or aromatic compounds, and many other.

If a mercury complex is not used as the opaque liquid, the one liquid 4 must be colored so that it is opaque. This can be accomplished with a dye, or, depending on the nature of the two liquids, by the addition of an indicator, carbon black or other pigments. Special care must be taken to ensure that the coloring will remain unchanged, selective and extremely stable for years. To prevent the pigment from settling out, the particle size selected should be fine enough to permit suspension stability by the Brownian movement.

It is preferred that the measuring cell 3 be cylindrical in construction so that the luminous flux passing through the transparent portion of the parallel circular faces is a very simple function of the angle $\phi$; i.e., so that they are proportional. The ratio of the diameter E of the circle of the cylinder faces of cell 3 to the height F of the cylinder can be in the range of from about 10,000:1 to about 10:1, but is preferably in the range of from about 2,000:1 to about 50:1. The covers or housings 6 and 7 may be cap-shaped and/or spherical, and should be coated or vacuum-plated on the inside in a manner sufficient to give them a high degree of reflectivity, thus ensuring a uniform distribution of light. The coating used on the inner surfaces should preferably be pure white and highly reflective.

The light source 8 may suitably consist of incandescent lamps or light-emitting diodes which have been matched to the optoelectronic element 9 with respect to wavelength and radiation capacity. If incandescent lamps are used, care must be taken to ensure that, through their design and by artifical aging, the lamps have been provided with stable photometric data which, thus, can be calibrated. A suitable means of obtaining a uniform distribution of light is to mount a flat diffuse radiating surface 11 in front of the light source 8, as shown in FIG. 1. The optoelectronic element can suitably consist of basically any optoelectronic receiver, be it a photoconductive cell, photodiode, photoelectric cell, phototransistor, photothyristor or photomultiplier. Special care should be taken to ensure that the optoelectronic element 9 maintains high linearity between measurement values (voltage, resistance, current) and keeps the same intensity of illumination over several decades. Photodiodes or photoelectric cells are preferable because of their proportionality between photoelectric current or short-circuit current and intensity of illumination, since this eliminates the need for costly linearization.

The distance R between light source 8 and the optoelectronic element 9 should be selected and adjusted so as to ensure a minimal error give the range of the light transmitter 8 and light receiver 9.

In light of the foregoing disclosure, further alternative embodiments of the inventive optoelectronic theodolite sensor will undoubtedly suggest themselves to those skilled in the art. It is thus intended that the disclosure be taken as illustrative only and that it not be construed in any limiting sense. Modification and variation may be resorted to without departing from the spirit and the scope of this invention, and such modifications and variations are considered to be within the purview and the scope of the appended claims.

What is claimed is:

1. An optoelectronic theodolite sensor comprising:
    (a) a vertically positioned hollow measuring cell having spaced parallel faces confining an opaque liquid filling half of the height of said measuring cell, said parallel faces each having a transparent verticle side portion and an opaque verticle side portion, with said opaque portions positioned opposite to and congruent with each other and said transparent portions positioned opposite to and congruent with each other;
    (b) at least one light source positioned on one side of said measuring cell and spaced therefrom; and,
    (c) at least one optoelectronic sensing element positioned on the other side of said measuring cell and spaced therefrom,
    whereby rotation of said measuring cell from the verticle causes the level of said opaque liquid to vary the luminous flux passing through the transparent side portion of said measuring cell from said light source to said optoelectronic sensing element to thereby cause an output signal change measurable as a function of the angle of rotation from the verticle axis and the horizontal axis of said measuring cell.

2. An optoelectronic theodolite sensor according to claim 1 wherein said spaced parallel faces confine a transparent liquid filling the upper half of the height of said measuring cell above said opaque liquid, said transparent liquid has a density substantially lower than the opaque liquid density, said transparent and opaque liquids are immiscible, and said transparent and opaque liquids form a binary liquid system having a sharp dividing line at the contact surface.

3. An optoelectronic theodolite sensor according to claim 2 wherein said binary liquid system is selected from the group consisting of two organic substances, two inorganic substances, and one organic substance with one inorganic substance.

4. An optoelectronic theodolite sensor according to claim 2 wherein said transparent and opaque liquids each have a vapor pressure and a melting point which is low.

5. An optoelectronic theodolite sensor according to claim 1 wherein said opaque liquid is selected from the group consisting of a mercury complex, a colored organic compound and a colored inorganic compound.

6. An optoelectronic theodolite sensor according to claim 1 wherein said hollow measuring cell is cylindrical.

7. An optoelectronic theodolite sensor according to claim 6 wherein said measuring cell has a cylindrical diameter to height ratio of from about 10,000:1 to about 10:1.

8. An optoelectronic theodolite sensor according to claim 7 wherein said diameter to height ratio is from about 2,000:1 to about 50:1.

9. An optoelectronic theodolite sensor according to claim 1 including a housing encompassing said measuring cell, said light source and said optoelectronic sensing element.

10. An optoelectronic theodolite sensor according to claim 9 wherein said housing has an inside surface possessing a high degree of reflection.

11. An optoelectronic theodolite sensor according to claim 9 wherein said housing has a spherical shape.

12. An optoelectronic theodolite sensor according to claim 1 wherein said light source produces a wavelength and radiated power which are matched to said optoelectronic sensing element.

13. An optoelectronic theodolite sensor according to claim 1 wherein said optoelectronic sensing element is selected from the group consisting of a photoconductive cell, a photodiode, a photoelectric cell, a phototransistor, a photothyristor, and a photomultiplier.

14. An optoelectronic theodolite sensor according to claim 1 wherein said light source is selected from the group consisting of incandescent lamps and light-emitting diodes.

15. An optoelectronic theodolite sensor according to claim 1 including a supporting element maintaining said measuring cell, said light source and said optoelectronic sensing element in spaced apart relationship with said measuring cell positioned between said light source and said optoelectronic sensing element.

16. An optoelectronic theodolite sensor according to claim 15 further including a housing encompassing said supporting element, said measuring cell, said light source and said optoelectronic sensing element.

17. An optoelectronic theodolite sensor according to claim 16 wherein said housing has a spherical shape.

18. An optoelectronic theodolite sensor according to claim 16 wherein said housing has an inside surface possessing a high degree of reflection.

19. An optoelectronic theodolite sensor according to claim 1 wherein the distance between said light source and said optoelectronic sensing element is adjusted to ensure minimal error given the range of said light source and said optoelectronic sensing element.

* * * * *